US008566531B2

United States Patent
Burkard et al.

(10) Patent No.: US 8,566,531 B2
(45) Date of Patent: Oct. 22, 2013

(54) SYSTEM AND METHOD OF SELECTIVELY CACHING INFORMATION BASED ON THE INTERARRIVAL TIME OF REQUESTS FOR THE SAME INFORMATION

(75) Inventors: Timo Burkard, San Francisco, CA (US); David Presotto, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1036 days.

(21) Appl. No.: 12/545,225

(22) Filed: Aug. 21, 2009

(65) Prior Publication Data

US 2011/0047317 A1    Feb. 24, 2011

(51) Int. Cl.
*G06F 12/12* (2006.01)
(52) U.S. Cl.
USPC .............. 711/138; 711/134; 711/159
(58) Field of Classification Search
None
See application file for complete search history.

(56) References Cited

U.S. PATENT DOCUMENTS

| | | | |
|---|---|---|---|
| 5,297,270 A | 3/1994 | Olson | |
| 5,513,336 A | 4/1996 | Vishitzky et al. | |
| 5,813,031 A * | 9/1998 | Chou et al. | 711/122 |
| 5,892,914 A * | 4/1999 | Pitts | 709/219 |
| 7,165,095 B2 | 1/2007 | Sim | |
| 7,496,715 B1 | 2/2009 | Vartti et al. | |
| 7,644,230 B1 | 1/2010 | Hughes et al. | |
| 8,166,248 B2 * | 4/2012 | Provenzano et al. | 711/133 |
| 2002/0026561 A1 * | 2/2002 | Park | 711/137 |
| 2002/0032671 A1 | 3/2002 | Iinuma | |
| 2002/0156980 A1 | 10/2002 | Rodriguez | |
| 2003/0005457 A1 | 1/2003 | Faibish et al. | |
| 2003/0061449 A1 | 3/2003 | Beyda | |
| 2004/0168031 A1 | 8/2004 | Haskins | |
| 2005/0010727 A1 | 1/2005 | Cuomo et al. | |
| 2005/0060497 A1 | 3/2005 | Krissell et al. | |
| 2006/0112233 A1 * | 5/2006 | Hu et al. | 711/138 |
| 2007/0022251 A1 | 1/2007 | Chi et al. | |

(Continued)

FOREIGN PATENT DOCUMENTS

KR    20040002043 A    1/2004

OTHER PUBLICATIONS

Keramidas, Georgios, Pavlos Petoumenos, and Stefanos Kaxiras. "Cache replacement based on reuse-distance prediction." Computer Design, 2007. ICCD 2007. 25th International Conference on. IEEE, 2007.*

(Continued)

*Primary Examiner* — Christian P Chace
*Assistant Examiner* — Nicholas Simonetti
(74) *Attorney, Agent, or Firm* — Lerner, David, Littenberg, Krumholz & Mentlik, LLP

(57) ABSTRACT

A system and method is provided wherein, in one aspect, a currently-requested item of information is stored in a cache based on whether it has been previously requested and, if so, the time of the previous request. If the item has not been previously requested, it may not be stored in the cache. If the subject item has been previously requested, it may or may not be cached based on a comparison of durations, namely (1) the duration of time between the current request and the previous request for the subject item and (2) for each other item in the cache, the duration of time between the current request and the previous request for the other item. If the duration associated with the subject item is less than the duration of another item in the cache, the subject item may be stored in the cache.

27 Claims, 6 Drawing Sheets

(56) References Cited

U.S. PATENT DOCUMENTS

| | | |
|---|---|---|
| 2008/0010414 A1* | 1/2008 | Kailas et al. .................. 711/133 |
| 2008/0034133 A1 | 2/2008 | Thomas et al. |
| 2008/0147250 A1 | 6/2008 | Oesterling et al. |
| 2009/0144388 A1 | 6/2009 | Gross et al. |

OTHER PUBLICATIONS

O'neil, Elizabeth J., Patrick E. O'neil, and Gerhard Weikum. "The LRU-K page replacement algorithm for database disk buffering." ACM SIGMOD Record. vol. 22. No. 2. ACM, 1993.*

Karlsson, Martin, and Erik Hagersten. "Timestamp-based selective cache allocation." High Performance Memory Systems. Springer New York, 2004. 43-59.* http://en.wikipedia.org/wiki/Adaptive_Replacement_Cache, printed Jun. 18, 2009.

http://en.wikipedia.org/wiki/Cache_algorithms, printed Jun. 18, 2009.

http://en.wikipedia.org/wiki/Page_replacement_algorithm, printed Jun. 18, 2009.

http://en.wikipedia.org/wiki/Pseudo-LRU, printed Jun. 18, 2009.

http://en.wikipedia.org/wiki/Least_Frequently_Used, printed Jun. 18, 2009.

PCT Notification of Transmittal of the International Search Report and the Written Opinion of the International Searching Authority, or the Declaration for PCT/US2010/002317, Apr. 29, 2011, 12 pages.

* cited by examiner

SYSTEM AND METHOD OF SELECTIVELY CACHING INFORMATION BASED ON THE INTERARRIVAL TIME OF REQUESTS FOR THE SAME INFORMATION

BACKGROUND OF THE INVENTION

A cache is commonly provided in a system having a processor to store items of information for access by the processor at a lower "cost" than if the cache were not present. For example, a system may be structured such that the processor can obtain data or program instructions stored in one memory faster than other memories. This memory may be used as a cache so that frequently-accessed information contained in the other memories may be copied into and accessed from the cache instead. In addition, the use of a cache may help to reduce internal data traffic between the processor and internal system elements such as a memory or input-output interface when the information items are available locally, as well as reduce external data traffic between the system and a remote system when the information is not available locally.

Caches are often too small to store all of the information a processor may need. Accordingly, cache-based systems typically need to be selective when it comes to determining which information will be stored in the cache. For example, a processor may repeatedly and frequently access ten different items of information, but the cache may only be able to store five.

Various algorithms have been used to determine when an item should be stored in the cache. For example, some existing systems automatically store the most-recently used information in the cache. If the processor recently processed ten items and the cache can store five, the last five discrete items are stored in the cache regardless of how often the items are used.

SUMMARY OF THE INVENTION

In one aspect, a method is provided that includes: receiving a request to process an item of information at a processor with an associated cache; retrieving the requested item from the cache when the item is stored therein; retrieving the requested item from another memory when the item is not stored in the cache; processing the item without storing the item in the cache when the item has not been previously requested within a predetermined period; processing the item without storing the item in the cache when the item has been previously requested within a predetermined period and the time of the previous request is earlier than the latest request for each item within a set of items stored in the cache; and processing the item and storing the item in the cache when the item has been previously requested within the predetermined period and the time of the previous request is later than the latest request of at least one item within the set of items stored in the cache.

In another aspect, a method is provided that comprises: receiving a current request for a first item of electronically-stored information, the first item being stored in a first memory; providing the first item from a second memory when the first item is also stored therein; providing the first item from the first memory when the first item is not stored in the second memory; determining, with a processor, whether the first item has been previously requested within a predetermined period of time; determining, with a processor, a first duration associated with the first item when the first item has been determined to have been previously requested, where the first duration is the duration of time between the current request for the first item and the previous request for the first item; determining, with a processor, a second duration for each item of a set of previously-requested second items stored in the second memory, where the second value is the duration of time between the current request for the first item and the latest request for the second item; and storing the first item in the second memory when the first item has been previously requested and the first duration is less than at least one of the second durations.

Still another method relates to: receiving a request for a first item of electronically-stored information; providing the first item from a first memory without storing the first item in a second memory when the first item has not been previously requested within a predetermined period of time; providing the first item from the second memory when the first item is stored therein, the second memory also storing a plurality of other items each of which has been previously requested at least twice; providing the first item from the first memory without storing the first item in second memory when the first item has not been previously requested within a predetermined period of time; determining, with a processor, a first value associated with the first item when the first item has been determined to have been previously requested, where the first value is based on the duration of time between previous requests for the first item; determining, with a processor, a second value associated with each item of a set of previously-requested second items stored in the second memory, where the second value is based on the duration of time between the current request for the first item and the latest request for the second item and; providing the first item from the first memory and storing the first item in the second memory when the first item has been previously requested within a predetermined period of time, and based on a comparison of the first value with the second value.

A further aspect provides a system that includes a cache configured to store items of information, other memory configured to store items of information, and a processor configured to retrieve and store items in the cache in accordance with instructions and provide the items to a requesting device. The instructions include, in response to a request for a requested item from the requesting device: retrieving the requested item from the cache when the requested item is stored therein; retrieving the requested item from the other memory when the requested item is not stored in the cache; providing the requested item to the requesting device, without storing the requested item in the cache prior to the next request, when the item has not been previously requested within a predetermined period; providing the requested item to the requesting device, without storing the requested item in the cache prior to the next request, when the item has been previously requested within a predetermined period and the time of the previous request is earlier than the latest request for each item within a set of items stored in the cache; and providing the requested item to the requesting device, and storing the requested item in the cache prior to the next request, when the item has been previously requested within the predetermined period and the time of the previous request is later than the latest request of at least one item within the set of items stored in the cache.

Another system may include a processor configured to retrieve and store items in memory in accordance with instructions. It may also include a first memory having a first capacity and a first access time (where access time refers to the average time it takes for the processor to obtain information from a memory), a second memory having a higher capacity and slower access time than the first memory and a third memory having a higher capacity and slower access time than the second memory. The instructions may include, in response to a request for a request for the item received by the processor: retrieving the requested item from first memory when the requested item is stored in the first memory; retrieving the requested item from second memory when the requested item is stored in the second memory; retrieving the requested item from third memory when the requested item is stored in the third memory; storing the requested item in the first memory depending on whether the item was stored in the second memory at the time of the request and whether the time elapsed since the last time the item was requested is less than the last-eviction duration, where the last-eviction duration comprises the duration of time beginning with the last request for the most-recently evicted item while it was still stored in the first memory and ending with the most-recently evicted item's eviction from the first memory; storing the requested item in the second memory depending on whether the item was stored in the second memory at the time of the request and whether the item was retrieved from the third memory.

DETAILED DESCRIPTION

In accordance with one aspect of the invention, a currently-requested item of information is stored in the cache based on whether it has been previously requested and, if so, the time of the previous request. Specifically, if the item has never been previously requested, the item is not stored in the cache (where "never" may refer to a predetermined period of time, such as "never within the 24 hours" or never within a period of time that is dynamically determined based on data that changes over time). If the subject item has been previously requested, the subject item is cached based on a determination and comparison of durations, namely (1) the duration of time between the current request and the previous request for the subject item and (2) for each other item in the cache, the duration of time between the current request and the previous request for the other item. If the duration associated with the subject item is less than the duration of another item in the cache, the subject item will be stored in the cache.

Figure 1:
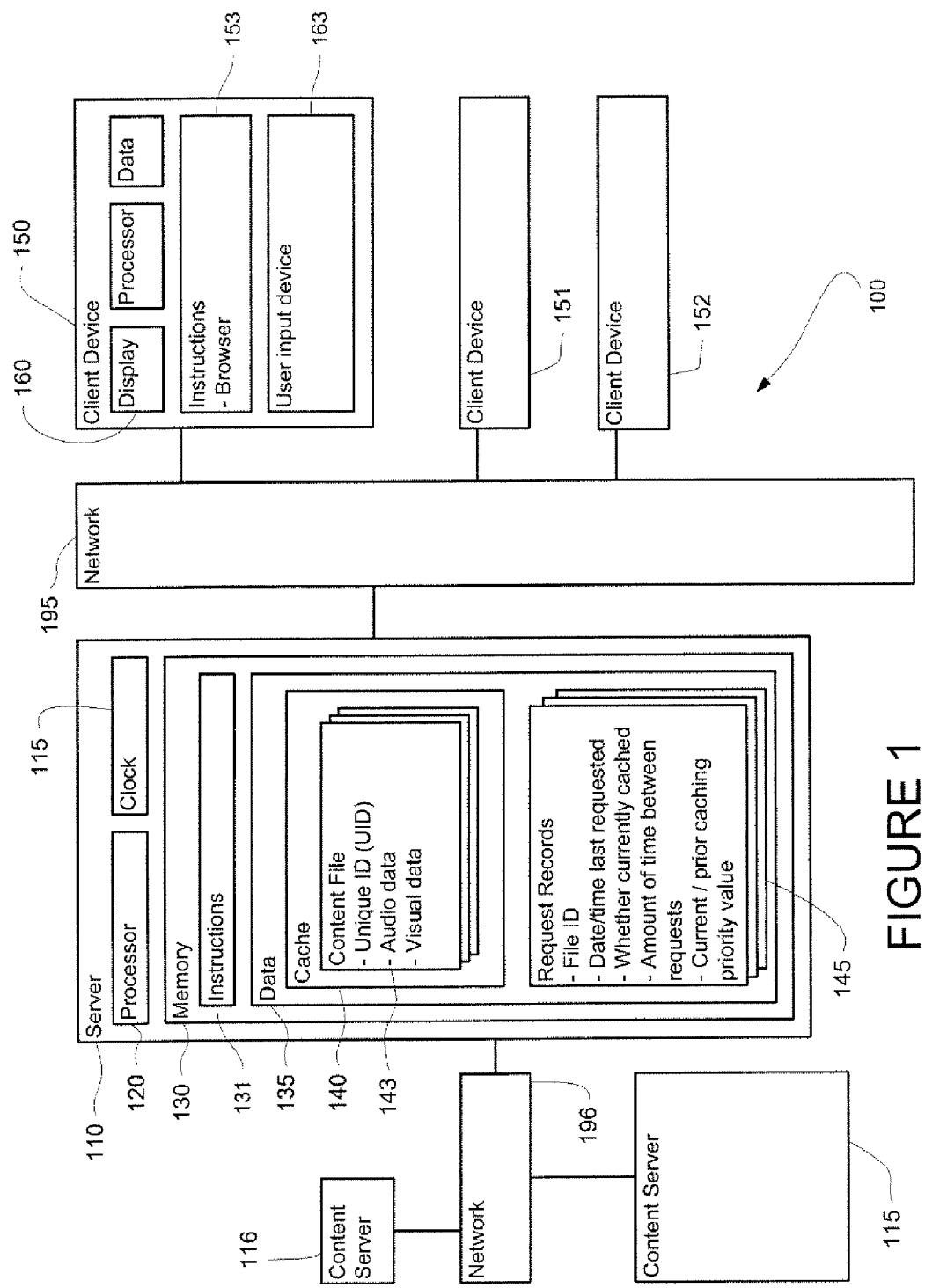
FIG. 1 is a functional diagram of a system of servers and client devices in accordance with an aspect of the invention.

As shown in FIG. 1, a system 100 in accordance with one aspect of the invention includes a computer 110 containing a processor 120, memory 130, clock 115 and other components typically present in general purpose computers. Memory 130 stores information accessible by processor 120, including instructions 131 that may be executed by the processor 120. It also includes data 135 that may be retrieved, manipulated or stored by the processor. The memory may be of any type capable of storing information accessible by the processor, including a computer-readable medium such as a hard-drive, memory card, ROM, RAM, DVD or other optical disks, as well as other write-capable and read-only memories. The processor 120 may be any well-known processor, such as processors from Intel Corporation or AMD. Alternatively, the processor may be a dedicated controller such as an ASIC.

The instructions 131 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 135 may be retrieved, stored or modified by processor 120 in accordance with the instructions 131. For instance, although the system and method is not limited by any particular data structure, the data may be stored in computer registers, in a relational database as a table having a plurality of different fields and records, XML documents or flat files. The data may also be formatted in any computer-readable format such as, but not limited to, binary values, ASCII or Unicode. Image data may be stored as bitmaps comprised of pixels that are stored in accordance with formats that are compressed or uncompressed, lossless (e.g., BMP) or lossy (e.g., JPEG), and bitmap or vector-based (e.g., SVG), as well as computer instructions for drawing graphics. Video data may be stored in a variety of formats including MPEG, GIF, AVI, M-JPEG, Flash, QuickTime and others. The data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Accordingly, references to a computer, processor and memory will be understood to include references to a collection of computers, processors or computers that may or may not operate in parallel.

Computer 110 may be located at one or more nodes of a network 195 and capable of directly and indirectly communicating with other nodes of the network. For example, computer 110 may comprise a web server that is capable of communicating with client devices 150-52 via network 195, delivering web pages to the client devices 150-52 and receiving information and requests in response. Server 110 may use network 195 to transmit and display information to a user on monitor 160 of client device 150.

Network 195, and intervening nodes between server 110 and client devices, may comprise various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing. Although only a few computers are depicted in FIG. 1, it will be appreciated that a typical system can include a large number of connected computers.

Each client device may be configured similarly to the server 110, with a processor, memory and instructions. Each client device 150-52 may be a personal computer, intended for use by a person 190-191, having all the internal components normally found in a personal computer such as a central processing unit (CPU), display device 160 (for example, a monitor having a screen, a projector, a touch-screen, a small LCD screen, a television, or another device such as an electrical device that is operable to display information processed by a processor), DVD drive, hard-drive, user input device 163 (for example, a mouse, keyboard, touch-screen or microphone), speakers, modem or network interface device (telephone, cable, wireless or otherwise), and all of the components used for connecting these elements to one another.

Although the client devices 150-52 may comprise a full-sized personal computer, the system and method may also be used in connection with mobile devices capable of wirelessly exchanging data with a server over a network such as the Internet. For example, a client device may be a wireless-enabled PDA such as a Blackberry phone or an Internet-capable cellular phone. The user may input information using a small keyboard (in the case of a Blackberry phone), a keypad (in the case of a typical cell phone), a touch screen (in the case of a PDA) or any other user input device. Indeed, computers in accordance with the systems and methods described herein may comprise any device capable of processing instructions and transmitting data to and from humans and other computers including general purpose computers, network computers lacking local storage capability, and set-top boxes for televisions.

In addition to server 110, system 100 may include other servers as well. For example, servers 115-16 may store information to be delivered to other nodes of the network such as audio/visual video files offered via Google's YouTube service. Other non-limiting examples of content includes music, still images, programs including computer games and combinations of the foregoing. The visual content may be rendered to a user via the electronic display 160 of the client device and the audio content may be rendered via speakers associated with the client device. The content may be provided for free or fee-based, and may be restricted or subject to digital rights management (DRM).

Server 110 may communicate with content servers 115-16 via a network 196. The network may be configured similarly to network 195. Indeed, in at least one aspect, networks 195 and 196 share the same nodes; for example, both networks 195 and 196 may comprises the Internet.

Server 110 may include a cache 140 that stores information that may be required by the server for future use. For example, the cache may store content files originally received from servers 115-16 and provided to the client devices 150-52. As explained in more detail below, this is just one possible aspect of a system and method in accordance with the invention.

In one aspect and in many circumstances, the server 110 is typically able to deliver information from cache 140 to client devices 150-52 faster than obtaining the information from content servers 115-16. For example, server 110 may be geographically closer to the client devices than the content servers. Server 100 may also be topologically closer to the client devices, e.g., if the Internet is serving as both network 195 and network 196, there may be more intervening nodes between content server 115 and client device 150 than between server 110 and client device 150. Yet further, the cache 140 may be stored in the same housing as processor 120, such as a large hard drive physically located within a server; such configurations typically provide the processor with very fast access to the information. However, the cache 140 may also be in another location that results in more latency than a hard drive but less latency than obtaining the information from content servers 115-16.

The system and method may store, retrieve and process information in various formats, configurations and sizes. In that regard, the items of information stored in the cache can be of different sizes or can have the same size. In some aspects, each item is a single file that represents all of the information desired by a user (e.g., the file is a music video of an entire song). In other aspects, each item is a fixed-size packet of information that cannot be meaningfully used by a user until the user's client device receives and assembles multiple packets together. Combinations of the foregoing are also possible, e.g., each individual item in the cache may be fixed-sized portion of a music video, and the server 110 streams a music video to the user's client device by retrieving and transmitting individual packets from the cache.

The system and method may also process data indicative of the length of time between requests for items. For example, data 135 may store request records 145 where each record identifies a content file 143 stored in cache 140 and the date and time that the file was last requested by a client device. In one aspect, the request records 145 may be stored as a hash table where the key is the file's identifier (e.g., a unique number assigned to each different video file) and the key points to the date and time that a client device last requested the file.

The request records may also identify whether the item is stored in the cache, because not all requested items may be cached and previously-requested items may be cached and then evicted from the cache.

Some aspects may store additional information as well, as noted below.

Figure 5:
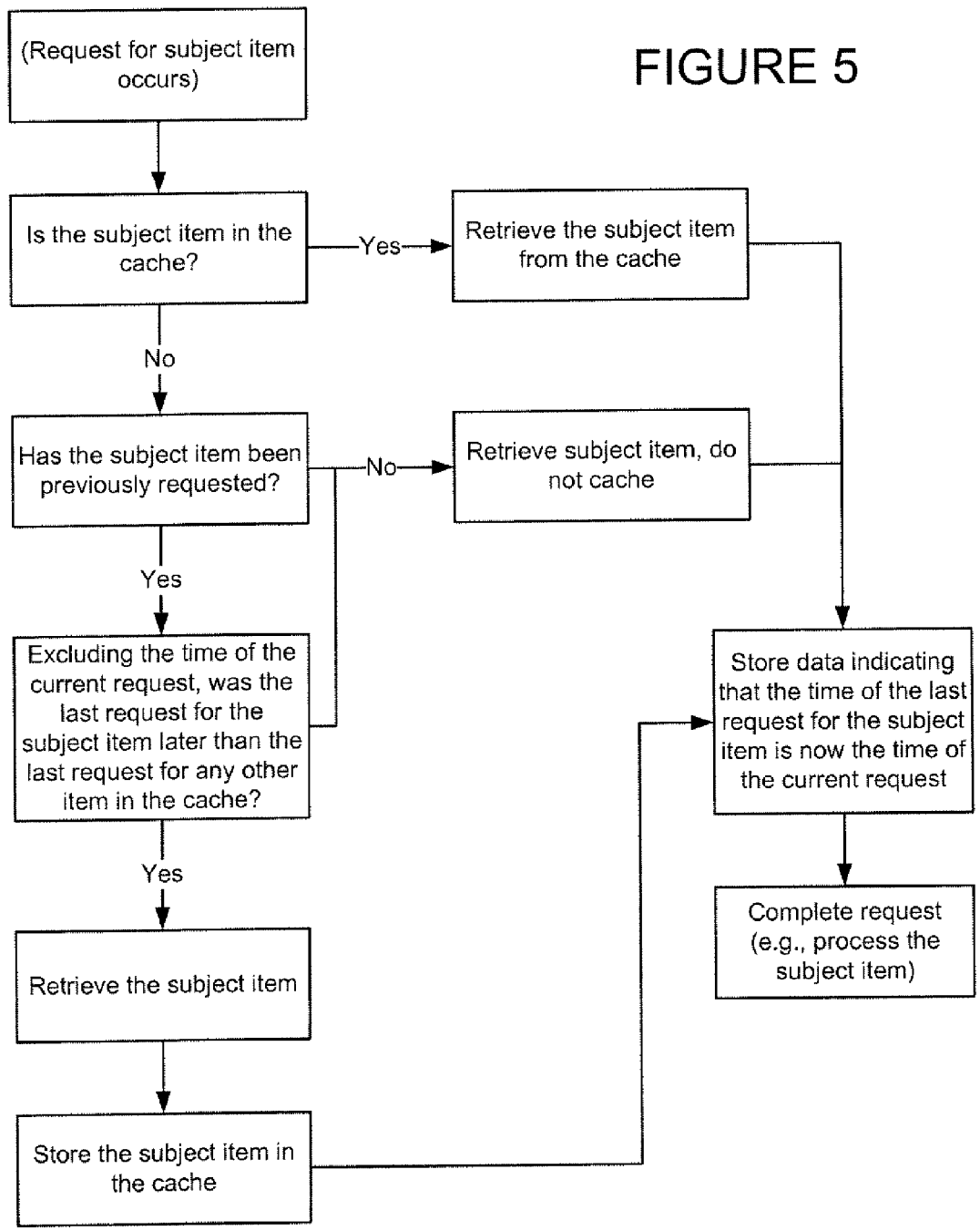
FIG. 5 is a flowchart in accordance with an aspect of the invention.

In addition to the operations illustrated in FIG. 5, various operations in accordance with a variety of aspects of the invention will now be described. It should be understood that the following operations do not have to be performed in the precise order described below. Rather, various steps can be handled in reverse order or simultaneously.

In one aspect, the system and method includes a server that uses the cache to store information that may be requested by the client devices. For example, server 110 may be one of many servers edge server associated with a website such as www.youtube.com. In that regard, a user may use client device 150 to interact with a web server that operates a video file search engine. The engine server may provide the user with a list of matching videos, and allow the user to then select and go to a webpage that is specific to the desired video. Although it was served by the engine server, this video-specific webpage may contain a URL that points directly at server 110 and the file's unique ID. Accordingly, when the user requests a copy of the video, such as by clicking a "play" button, the request is sent directly to server 110 rather than the engine server.

Upon receiving the request for the information, the system and method may cause the requested information to be retrieved and provided to the requesting entity. For example, server 110 may first determine whether cache 140 contains a copy of a requested content file. If the file is contained in the cache, the processor 120 may transmit a copy of the file from the cache 145 to client device 150 via network 195. If the file is not contained in the cache, the processor may request the file from one of the content servers 115-16 and forward it to the client device 150, such as by proxying. Alternatively, the server 110 may provide the content server or the client device with sufficient information so that the client device can obtain the file from the content server without passing the file through server 110, such as by providing a reference to the location via an HTTP 302 redirect.

When the processor receives a request for the information, it determines whether the information has been previously requested. For example, the server 110 may query request records 145 and determine whether the content file has been previously requested from any of the client devices 150-52. If the records are stored in a hash table, processor 120 may check the hash table for a record having a key that matches the file's UID. If such a key is missing, processor 120 determines that the file has not been previously requested. If the key is present, processor 120 determines that the file has been previously requested.

If the requested item has not been previously requested, the system and method does not cache the information but does store data related to the time of the request. For example, it may add a key/value pair to the hash table 145 that identifies the UID of the requested file and the date and time of the request. It may also include a value in the record, such as a flag, indicating that the file is not currently stored in the cache.

If the desired information has been previously requested, the processor determines the last time it was previously requested and compares it with information identifying the request times of other information in the cache. The decision to cache or not may be based on that determination.

In one aspect of the system and method, an item is cached if, excluding the time of the current request, it was more recently requested than another item in the cache. For example, assume that server 110 receives a request for "File #3" at 7:00 pm and the request records 145 identify the following information:

| UID | Date and time the item was last requested | Item currently stored in cache? |
|---|---|---|
| 1 | 1:00 pm | Yes |
| 2 | 2:00 pm | NO |
| 3 | 3:00 pm | NO |
| 4 | 4:00 pm | Yes |
| 5 | 5:00 pm | NO |
| 6 | 6:00 pm | Yes |

Based on the foregoing, File #3 was requested more recently (3:00 pm) than File #1 (1:00 pm)—excluding the time of the current request. Accordingly, File #3 would be stored to the cache.

If the cache lacks the capacity to store the currently-requested item, the system and method may remove the item that has sat in the cache the longest since its last request. Using the foregoing example, it has been six hours (7:00 pm minus 1:00 pm) since File #1 was previously requested. Therefore, no matter when the next request comes in for File #1, the duration between the last request and the next request cannot be any less than six hours. This duration is longer than any another duration for any other file. Accordingly, if there is not enough room for both File #1 and File #3, File #1 may be removed from the cache 140, File #3 may be added to the cache, and the request records 145 may updated as follows (changes from the last chart are shown in bold).

| UID | Date and time when the item was last requested | Item currently stored in cache? |
|---|---|---|
| 1 | 1:00 pm | NO |
| 2 | 2:00 pm | NO |
| 3 | 7:00 pm | Yes |
| 4 | 4:00 pm | Yes |
| 5 | 5:00 pm | NO |
| 6 | 6:00 pm | Yes |

If there is still insufficient room to store the currently-requested item after another item is removed, the system and method may continue to evict items until enough room is provided.

In one aspect, the system and method uses the data associated with the most-recently evicted item to determine whether the currently-requested item should be cached. For example, when File #1 is removed, server 110 may store a pointer in data 135 to the request record for File #1, as indicated by the "-X->" below.

| UID | Date and time when the item was last requested | Item currently stored in cache? |
|---|---|---|
| -X-> 1 | 1:00 pm | NO |
| 2 | 2:00 pm | NO |
| 3 | 7:00 pm | Yes |
| 4 | 4:00 pm | Yes |
| 5 | 5:00 pm | NO |
| 6 | 6:00 pm | Yes |

Assume that server 110 next receives a request for File #5 at 8:00 pm. Rather than comparing the last time that the currently-requested item was requested with every item in the cache, the processor may compare it with the most recently removed item. In that regard, having determined that File #5 was previously requested (5:00 pm) more recently than the file that was just evicted (File #1 at 1:00 pm), File #5 may be added to the cache. If File #4 had to be removed to make room for File #5, the resulting request records 145 may appear as follows.

| UID | Date and time when the item was last requested | Item currently stored in cache? |
|---|---|---|
| 1 | 1:00 pm | NO |
| 2 | 2:00 pm | NO |
| 3 | 7:00 pm | Yes |
| -X-> 4 | 4:00 pm | NO |
| 5 | 8:00 pm | Yes |
| 6 | 6:00 pm | Yes |

In another aspect, the system and method may compare the current item against the amount of time that the last-evicted item survived in the cache since its last request. Returning to the foregoing example, when the system and method had to pick an item to evict at 7:00 pm, it evicted File #1 because no other item had sat in the cache longer without a request. Thus, if one defines the "worst performer" as the most-recently evicted item, and if one defines its "wasted time" as the length of time it sat in the cache unrequested prior to its conviction, File #1 was the worst performer and it wasted six hours (7:00 eviction minus 1:00 last request).

In that regard, if the new item is expected to "waste" more time than the "worst performer," one aspect of the system and method may determine that the new item should not cached at all. In that regard and this aspect, File #5 will be cached when it is requested because the span between its last request (5:00 pm) and its current request (8:00 pm) is three hours, which is less time than that wasted by the worst performer (six hours). However, assume that File #11 is requested at the same time as File #5 (8:00 pm), but File #11 was previously requested nine hours ago (at 11:00 am). If File #11 was placed in the cache and it went another nine hours without a request, this would mean it wasted more time in the cache than the current worst performer: File #1 at six hours. Accordingly, the system and method may determine that File #11 should not be cached at all.

If the last time the currently-requested item was requested is earlier than other items in the cache, the processor may decide not to cache the item. Even so, it may still update the request records to reflect the time of the current request. For example, assume that the request records appear as follows when a request for File #1 is received at 9:00 pm.

| UID | Date and time when the item was last requested | Item currently stored in cache? |
|---|---|---|
| 1 | 1:00 pm | NO |
| 2 | 2:00 pm | NO |
| 3 | 7:00 pm | Yes |
| –X–> 4 | 4:00 pm | NO |
| 5 | 8:00 pm | Yes |
| 6 | 6:00 pm | Yes |

The system and method may compare the prior request for the currently-requested item (File #1 at 1:00 pm) with the latest request for the most recently evicted item (File #4 at 4:00). Even though File #4 was just evicted for remaining in the cache too long without a request, it was more recently requested than File #1 (putting aside the fact that the system is evaluating the current request for File #1). Thus, File #1 will not be placed in the cache, but its records will be updated as follows.

| UID | Date and time when the item was last requested | Item currently stored in cache? |
|---|---|---|
| 1 | 9:00 pm | NO |
| 2 | 2:00 pm | NO |
| 3 | 7:00 pm | Yes |
| –X–> 4 | 4:00 pm | NO |
| 5 | 8:00 pm | Yes |
| 6 | 6:00 pm | Yes |

In that regard, if File #1 is requested again an hour later at 10:00 pm, it will be added to the cache because it was requested more recently (9:00 pm) than the item that was just evicted (File #4 at 4:00 pm).

As noted above, one aspect of the system and method uses the time of the current request and the time of the last request (among other things) to determine whether an item should be cached.

In another aspect, the system and method uses the time of the current request, the time of the last request and the time of earlier requests as well to make the determination. Moreover, the system and method may apply different weights when making the determination. For instance, when determining whether an item should be cached, that time of the latest requests may be considered more important than the time of the earlier requests.

One such system and method uses exponential decay. By way of example only, each item may be assigned a priority value such that a lower priority item will be removed from the cache, if necessary, to make room for a higher priority item. Just one possible method comprises assigning each item a priority value of "E" where:

$$E_n = -1*(ALPHA*LS_n + (1-ALPHA)*E_{n-1});$$

"n" represents the $n^{th}$ occurrence of the request, e.g., $E_{10}$ represents the priority value of the item after it was requested 10 times;

"$LS_n$" represents the amount of time that elapsed between the $n^{th}$ occurrence of the request and the previous request, e.g., $LS_{10}$ represents the amount of time that elapsed between the ninth and tenth request for the item; and "ALPHA" represents a value between and including 0 and 1.

In that regard, the processor may calculate a priority value for an item each time it is requested. If the value indicates that the item is higher in priority than other items in the cache, the item is cached. If there is not enough room for the item in the cache, lower priority items may be removed. (It will be understood that the –1 multiplier in the foregoing formula may be omitted, in which case higher $E_n$ values may be considered less desirable for caching than lower $E_n$ value.)

As noted above, the priority value may be calculated such that recent requests are accorded more weight than older requests. In that regard, if the foregoing formula for $E_n$ is used, ALPHA may be selected to provide more or less weight to the most recent request. For example, if ALPHA is selected to be 0.9, 90% of the priority value will depend on the duration of time between the current request and the last request.

However, if ALPHA is selected to be 0.2, only 20% of the priority value will depend on the duration of time between the current request and the last request; the remainder of the value will depend on durations between prior requests. In that regard, ALPHA may be selected based on the needs of the system. ALPHA may also be automatically and dynamically adjusted over time based on periodic statistical analyses of the system.

The impact of a prior request on an item's cache priority may exponentially diminish as more subsequent requests are received. For example, assume there are 10 requests for the item. Even if the ALPHA value of $E_n$ is set to 0.2 (making only 20% of the priority value dependant on the duration between the two most recent requests), the duration of time between the 1st and 2nd requests will affect the priority value far less than the duration of time between the 9th and 10th requests. Indeed, if ALPHA is 0.2 and there are approximately 10 requests, the impact of the latest duration relative to the earliest durations may be approximately 10:1. On the other hand, ALPHA may be set to 1, in which case the priority value depends entirely on the duration between the latest requests.

If a request for an item is received for the first time and the foregoing formula for $E_n$ is used, a default value for $E_{zero}$ may be selected. Because lower E values typically indicate higher priority items, a low default value for $E_{zero}$ may be selected if it is preferable to give never-seen-before items a high priority, and vice versa.

Alternatively, the request records 145 may store a single value of "E" for each item, i.e., it does not store a separate E value for each request of each item. In that regard, when an item is requested for the first time, a special value for E may be stored to indicate that the item's last request was also its first request. When the next request for the item is received, the system and method may check whether the current E value equals the special value. If so, the value of E may be calculated as if ALPHA=1, which places all of the weight in the formula to the span of time between the first and second request. If the system and method determines that the value of current value of E is not the special value, the formula may be calculated in accordance with the usual value of ALPHA. Regardless, the system and method may then replace the prior value of E with the newly-calculated value for E.

One of the advantages of the system and method is its flexibility, such as its ability is to be implemented in configurations that are different from the foregoing aspects or that can be synergistically combined with the foregoing aspects.

For example, the foregoing system and method may be combined with other systems and methods for determining whether an item of information should be cached. In that regard, there may be circumstances in which the item is cached in spite of the fact that it has never been previously requested. The processor may automatically store an item in the cache whenever there is room, i.e., the size of the item is less than the total capacity of the cache minus the combined sizes of the all of the other items (if any) stored in the cache. Alternatively, there may be other characteristics associated with an item that may indicate whether it should be cached. For example, the processor may be provided with information indicating that the file is very popular and the $E_n$ formula described above may include the popularity of the file as a weighted factor.

The system and method may also base a caching decision on the time of the request without storing the precise date and time of requests. As noted above in connection with priority values, the system and method may store a value that is calculated from a formula having many parameters, only one of which is the request time.

As also noted above, the system and method is not limited to any particular size of item. By way of example only, individual items may comprise variable-sized files, fixed-sized portions of data or both. One may consider the example of a variable-sized video file that is stored and streamed in fixed-size chunks, such as 8.5 MB file comprising four chunks of 2 MB each and one chunk of 0.5 MB. It is common for users to terminate a video after watching the beginning, so it is quite possible that the server will only send the first chunk or two. In one aspect, the system and method may consider each chunk to be a separate item, in which case the first two chunks might be cached but the remainder might not.

In another aspect, the system and method may consider the entire file to be a single item, in which case all of the chunks are cached in response to repeated requests for the file even if only the first one or two chunks are consistently delivered to end users. This aspect may be particularly useful when server 110 serves a file from another server by proxy in accordance with HTTP protocol; it may not be possible for server 110 to stream the first two chunks of a requested file from its cache and the remainder through a redirect to another server.

In still another aspect, the system and method may cache an entire item in accordance with the system and method yet evict portions of item in accordance with different criteria. For example, the server may cache all four chunks of the 8.5 MB file based on the request records for the file. However, the server may also use a well-known caching algorithm (e.g., a Least Recently Used (LRU) algorithm) to occasionally evict unpopular chunks, such as the last two chunks of the 8.5 MB file if they are rarely sent to users. As noted above, the system and method may determine whether to cache a newly-requested item by comparing the request times of the newly-requested file with the most-recently evicted item's span of survival. In the aspect described in this paragraph, the system and method may compare a newly-requested file's request times with the survival times of the most-recently evicted chunk.

Figure 2:
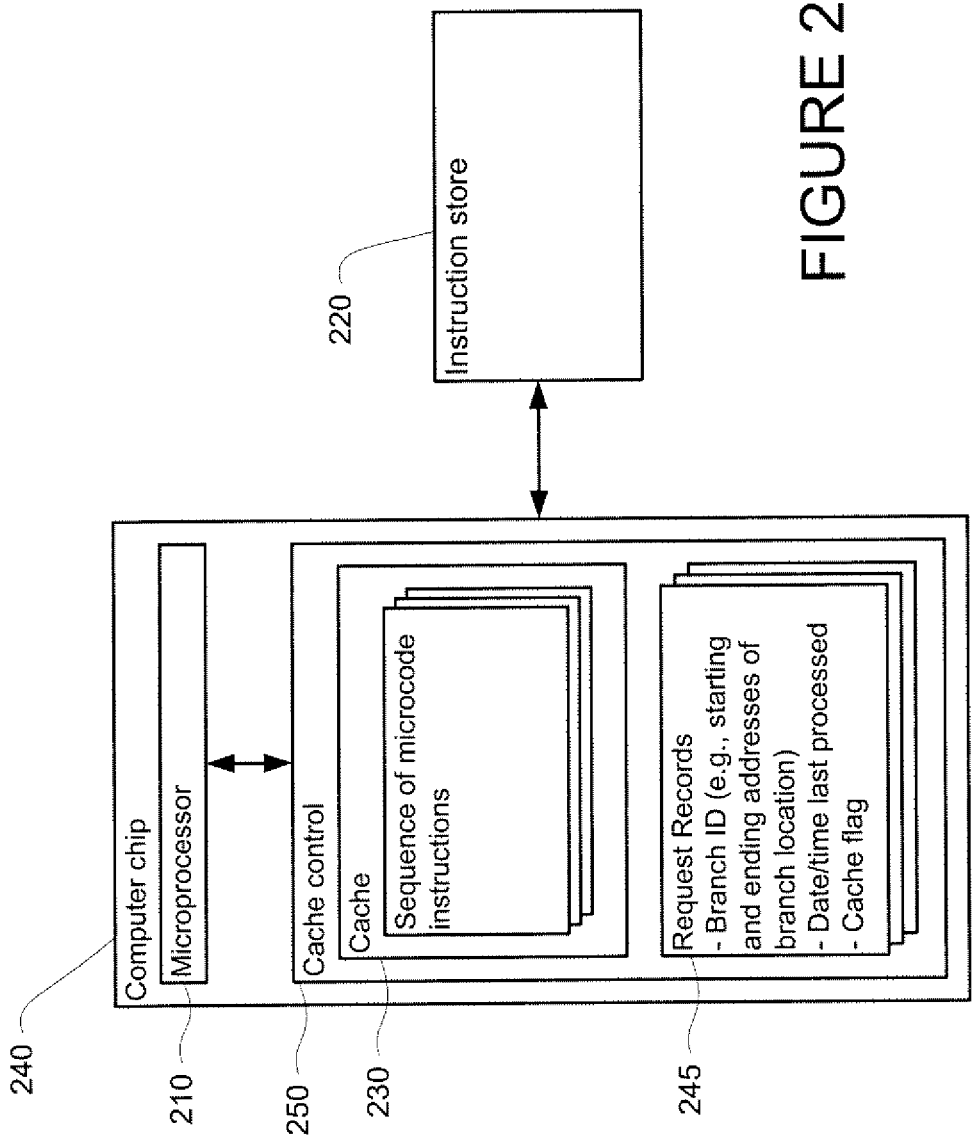
FIG. 2 is a functional diagram of a computer chip and instruction store in accordance with an aspect of the invention.

Moreover, while particular advantages may flow when the system and method is used in connection with large client/server content-delivery networks, certain aspects may also be implemented in an enclosed system as small as a computer chip. By way of example only and as shown in FIG. 2, a microprocessor 210 may pre-fetch sequences of microcode instructions from an instruction source 220 and store them in a relatively small cache 230 on a single semiconductor chip 240 if the system expects that the instructions will be used in the near future. In that regard, an individual item of information may constitute a sequence of microcode instructions that are retrieved and processed by the microprocessor. When the microprocessor 210 needs and instruction, it may request it from cache control 250. If the instruction is part of a branch of instructions and the instruction's branch is stored in cache 230, control 250 provides the instruction from the cache. Otherwise, control 250 obtains the applicable branch from instruction store 220. If the branch has been retrieved from store 220 for the first time, it will not be cached. However, if the branch has been previously retrieved, control 250 may decide to cache the branch based on the last time the branch was processed relative to the other branches stored in the cache.

Figure 3:
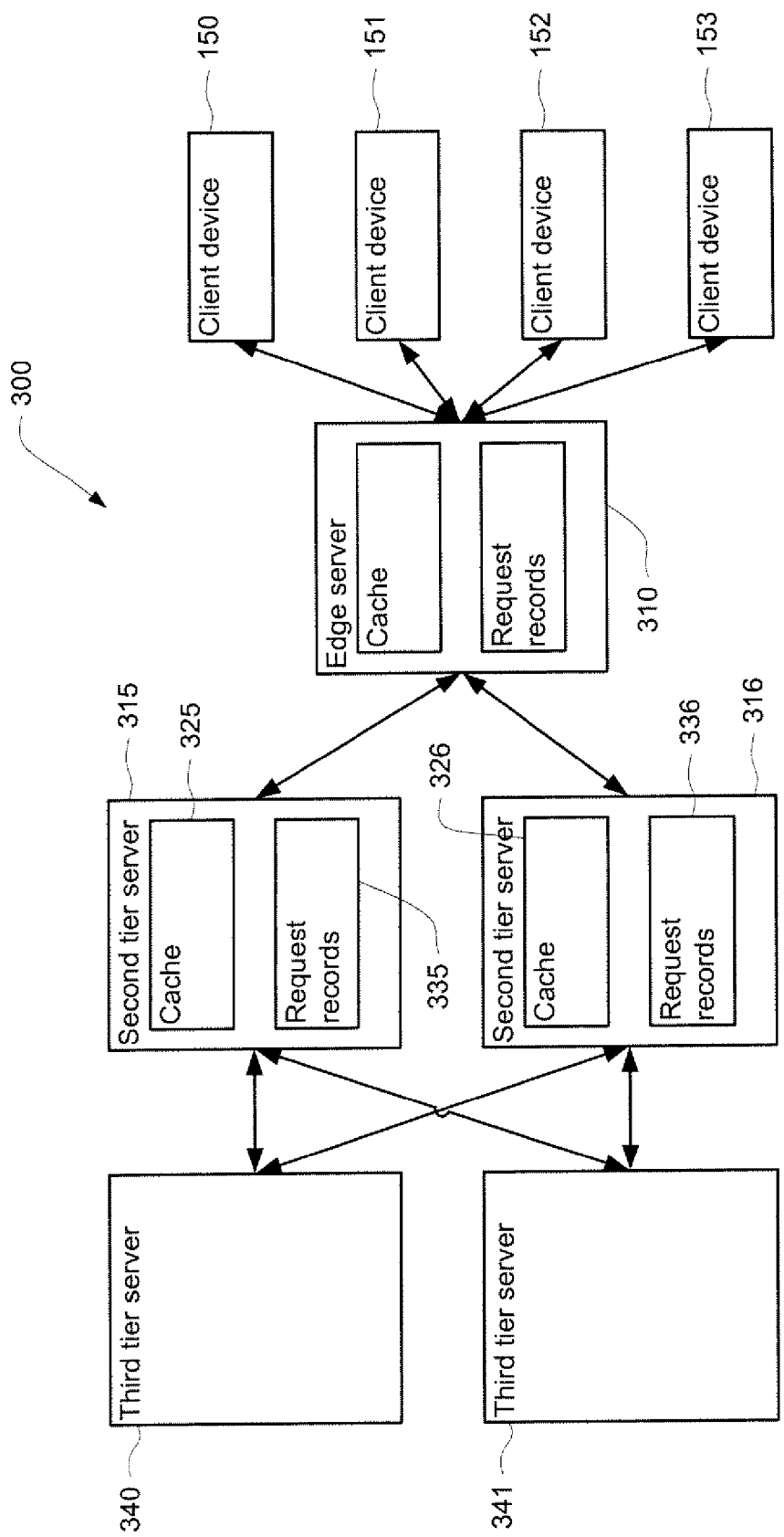
FIG. 3 is a functional diagram of a multi-tiered system of servers and client devices in accordance with an aspect of the invention.

Conversely, the system and method may be implemented in even larger network based systems than those described above. For example and as shown in FIG. 3, edge server 310 may request data from second tier servers 315-16, which may have their own caches 325-26 and sets of request records 335-36 and contain only a portion of files that are available from other servers operated by the company operating the servers illustrated in FIG. 3. In many circumstances, the second tier of servers will have greater storage capacity, such as a larger cache size, than the edge server. Second tier servers 315-16 may thus request files from other servers such as third tier servers 340-41, which in turn may store (or otherwise be capable of obtaining) all of the information available via server 310. A request for a file from any of the client devices 150-53 may thus cause requests for the file and its caching to cascade throughout multiple tiers of the entire system 300. In that regard, the system and method may be used to determine which files are to be cached at the edge server 310 and which should be redirected to large caches with larger capacity.

The system and method may be particularly advantageous when used in connection with regionally-distributed edge servers. For example, if the system and method is implemented at edge servers located in widely distributed in geographic areas, the requested served by the edge servers may vary greatly depending on the location. For example, a funny video clip with Japanese language may be more popular among users serviced by an edge cache in Tokyo, and thus the Tokyo-based edge server may store that clip. However, the clip may be less popular among users serviced by an edge cache in London and, accordingly, it will not store the clip.

Figure 4:
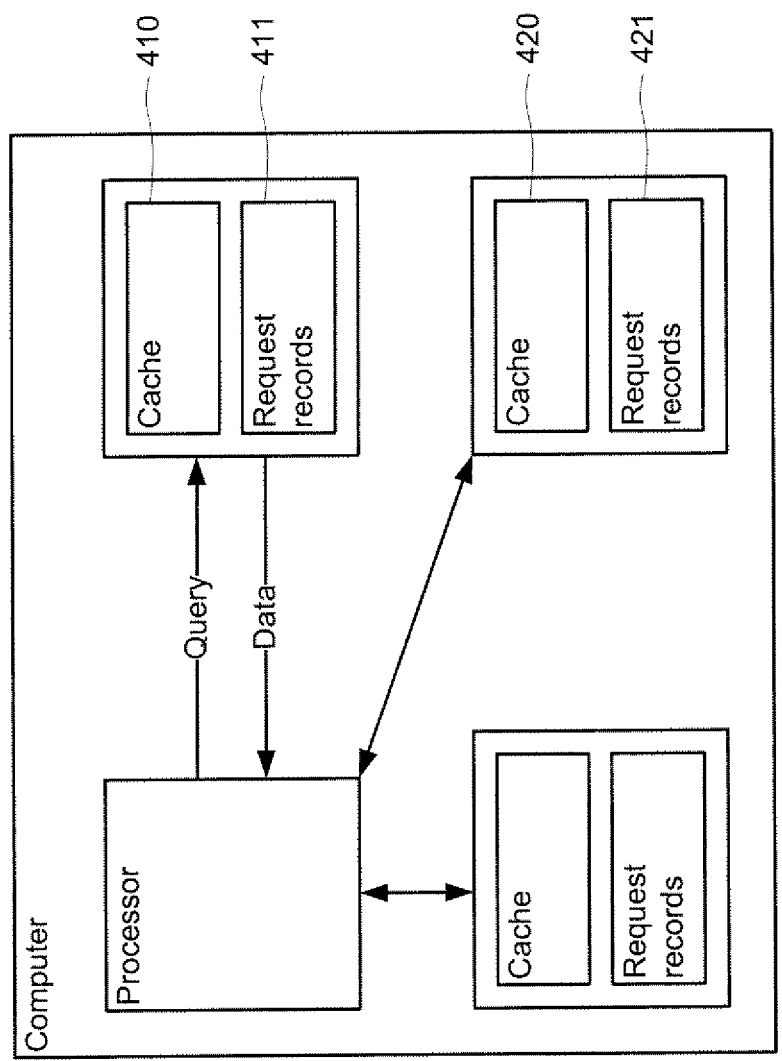
FIG. 4 is a functional diagram of computer in accordance with an aspect of the invention.

A single server may also have multiple tiers of caches and access those caches without the aid of a network. For example and as shown in FIG. 4, computer 400 may first check for an item by querying request records 410 associated with cache 411. If the item is not in cache 410, it may query a second independent set of request records 420 associated with a second independent cache 421. If the second cache does not contain the item, the computer may check other caches associated with other sets of request records.

In that regard, the system and method may be used in connection with devices having multiple memories of different types. For example, a server may locally access both a single solid state drive (e.g., a flash drive) and multiple local disk drives. The flash memory may have lower capacity than the disk drives, but it may also be able to provide the information faster, on average, than the disk drives. Yet further, a server may hold less than all of the information that may be requested from it; it may thus access information stored on servers that originate the information. This information may be stored in the form of chunks that collectively comprise video files.

Figure 6:
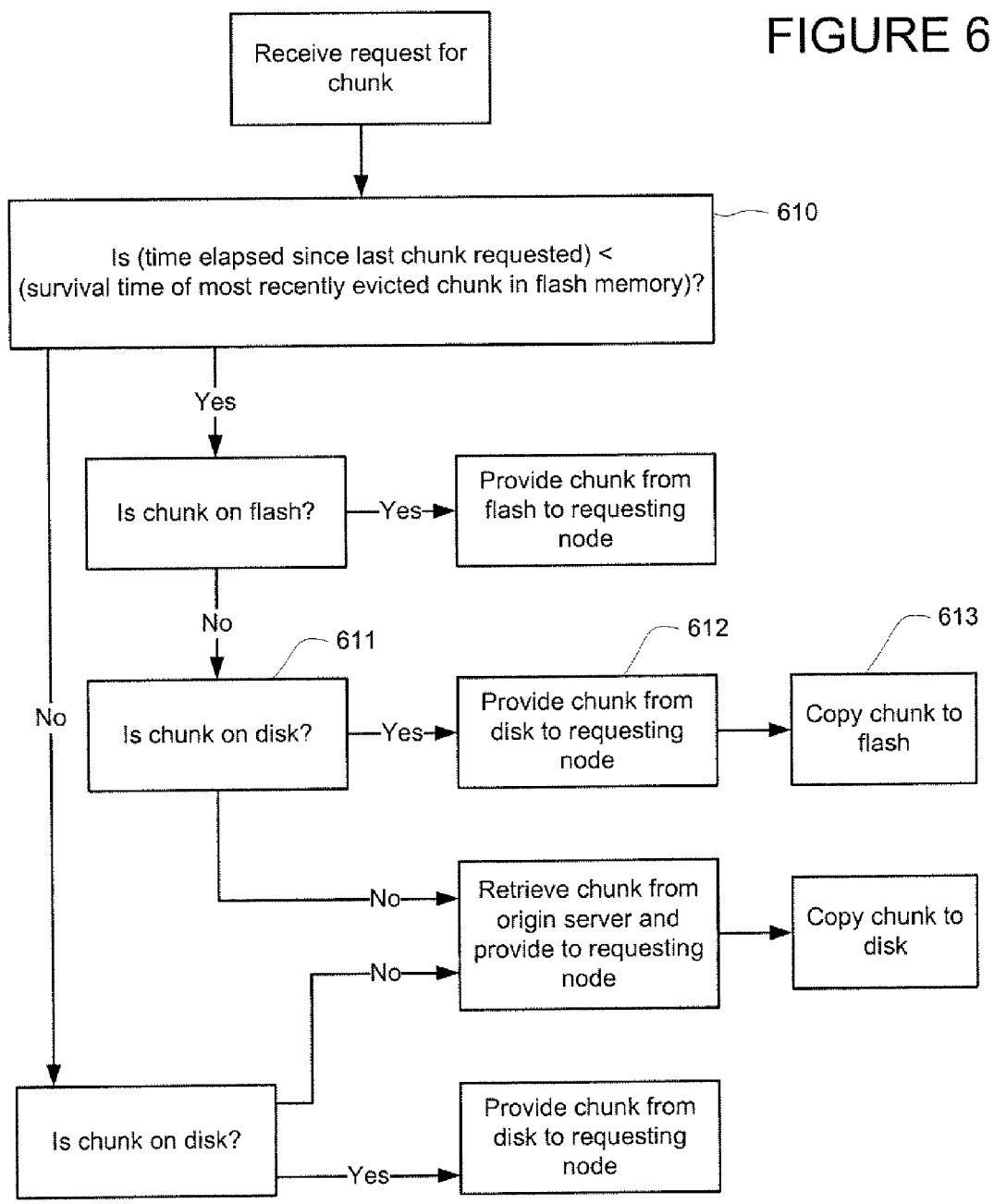
FIG. 6 is a flowchart in accordance with an aspect of the invention.

FIG. 6 illustrates just one method that may be implemented in a system that stores chunks of information in differing tiers of retrieval speed and capacity, e.g., flash memory, disk memory, and memory located at another node (such as from an origin server). The chunk will be retrieved from the fastest memory storing the chunk, e.g., from the flash memory if it is in the flash memory, from the disk memory if not, and from the origin server if it is stored in neither the flash nor disk memory. Moreover, whenever the chunk is retrieved from the origin server, a copy may be stored on the local disks (and evict the most inactive chunk from the local disks if necessary).

However, while a chunk may be automatically stored in the disk memory after the chunk is retrieved from the server, it may not be automatically placed in flash memory after it is retrieved from the disk. Moreover, a chunk may not be directly promoted from the origin server to the flash memory. Rather, in one aspect of the system and method and as shown at reference numerals 610-13, a chunk is only promoted from the disk memory to the flash memory when the time elapsed from its last request is less than the survival time of the most recently evicted chunk in flash memory.

In still another aspect, the system and method of FIG. 6 will automatically store a chunk in the flash memory if there is room. Alternatively, it may automatically store any chunk received from an origin server directly into the flash memory (e.g., bypassing the disks) during the time span that begins with the cache being in an empty state and the cache's first eviction of a chunk.

Rather than relying on the date and time that a client device requested an item, the cache may also use other time-based events as the basis for caching decisions. For example, if the item of information is an executable file and the system and method is implemented on a personal computer, the relevant time of request may be considered the time at which the file is loaded from a magnetic disk into a dedicated disk cache (i.e., the request originated in a component of the computer, the request constituted a demand to load the file into the disk cache, and the time of the request was when the file began loading). Alternatively, the time of request may be considered the time that the processor begins executing the file after loading it into RAM. Yet further, the time of a request may be considered the time the request was received, the time the request was sent, or the time the request was fulfilled.

The system and method may further include various measures to protect the data. For example, while the request records 145 may be stored as metadata in RAM for fast access, it records may also be persisted to disk every so often so that if a relevant program crashes or otherwise restarts, the state may be read from the disk rather than rebuilt.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "including" and the like) should not be interpreted as limiting the invention to the specific examples; rather, the examples are intended to illustrate only one of many possible embodiments.

The invention claimed is:

1. A method comprising:
receiving a request to process an item of information at a processor with an associated cache;
retrieving the requested item from the cache when the item is stored therein;
retrieving the requested item from another memory when the item is not stored in the cache;
processing the item without storing the item in the cache when the item has not been previously requested within a predetermined period;
processing the item without storing the item in the cache when the item has been previously requested within a predetermined period and the time of the previous request is earlier than the latest request for each item within a set of items stored in the cache; and
processing the item and storing the item in the cache when the item has been previously requested within the predetermined period and the time of the previous request is later than the latest request of at least one item within the set of items stored in the cache.

2. The method of 1 wherein the request is received over a network by a server from a client device and the request to process the item comprises sending the requested item to the client device.

3. The method of claim 2 wherein the item comprises audio or visual data to be rendered at the client device.

4. The method of claim 3 wherein the item comprises a file.

5. The method of claim 4 wherein the item comprises a portion of a file.

6. The method of claim 1 further comprising removing an item from the set of items when the latest request for the removed item is earlier than the latest request for any other item in the set.

7. The method of claim 6 wherein the item is removed prior to storing the requested item in the cache.

8. The method of claim 7 wherein the item is removed when the size of the requested item exceeds the size of the cache minus the combined size of the items in the set.

9. The method of claim 1 wherein the item comprises computer instructions and the request to process the item comprises processing the instructions.

10. The method of claim 1 wherein the item comprises a content file and the request to process the item comprises rending the content to a user.

11. The method of claim 1 wherein the set of items stored in the cache comprises all of the items stored in the cache.

12. A method comprising:
receiving a current request for a first item of electronically-stored information, the first item being stored in a first memory;
providing the first item from a second memory when the first item is also stored therein;
providing the first item from the first memory when the first item is not stored in the second memory;
determining, with a processor, whether the first item has been previously requested within a predetermined period of time;
determining, with a processor, a first duration associated with the first item when the first item has been determined to have been previously requested, where the first duration is the duration of time between the current request for the first item and the previous request for the first item;

determining, with a processor, a second duration for each item of a set of previously-requested second items stored in the second memory, where the second duration is the duration of time between the current request for the first item and the latest request for the second item; and storing the first item in the second memory when the first item has been previously requested and the first duration is less than at least one of the second durations.

13. The method of claim 12 further comprising storing the first item in the second memory based on other criteria.

14. The method of claim 13 wherein the other criteria comprises the popularity of the first item.

15. The method of claim 12 further comprising providing the first item by providing an entity requesting the item with a reference to the item's location.

16. The method of claim 12 further comprising providing the first item by providing an entity requesting the item with a copy of the item.

17. A method comprising:
receiving a request for a first item of electronically-stored information;
providing the first item from a first memory without storing the first item in a second memory when the first item has not been previously requested within a predetermined period of time;
providing the first item from the second memory when the first item is stored therein, the second memory also storing a plurality of other items each of which has been previously requested at least twice;
determining, with a processor, a first value associated with the first item when the first item has been determined to have been previously requested, where the first value is based on the duration of time between previous requests for the first item;
determining, with a processor, a second value associated with each item of a set of previously-requested second items stored in the second memory, where the second value is based on the duration of time between the current request for the first item and the latest request for the second item; and
providing the first item from the first memory and storing the first item in the second memory when the first item has been previously requested within a predetermined period of time, and based on a comparison of the first value with the second value.

18. The method of claim 17 wherein the second value is determined based on a weighted function and the weight applied to the duration between a request and a subsequent request decreases each time another request is received.

19. The method of claim 17 wherein the second value is based on the following function:

$$E_n = -1*(\text{ALPHA}*LS_n + (1-\text{ALPHA})*E_{n-1}),$$

where:
"$E_n$" represents the second value at the nth occurrence of the request;
"$E_{n-1}$" represents the second value at the (nth−1) occurrence of the request;
"n" represents the nth occurrence of the request;
"LSn" represents the amount of time that elapsed between the nth occurrence of the request for and the previous request; and "ALPHA" represents a value between and including 0 and 1.

20. The method of claim 18 wherein the first value is based on the weighted function.

21. A system comprising:
a cache configured to store items of information;
other memory configured to store items of information;
a processor configured to retrieve and store items in the cache in accordance with instructions and provide the items to a requesting device;
the instructions comprising, in response to a request for a requested item from the requesting device:
retrieving the requested item from the cache when the requested item is stored therein;
retrieving the requested item from the other memory when the requested item is not stored in the cache;
providing the requested item to the requesting device, without storing the requested item in the cache prior to the next request, when the item has not been previously requested within a predetermined period;
providing the requested item to the requesting device, without storing the requested item in the cache prior to the next request, when the item has been previously requested within a predetermined period and the time of the previous request is earlier than the latest request for each item within a set of items stored in the cache; and
providing the requested item to the requesting device, and storing the requested item in the cache prior to the next request, when the item has been previously requested within the predetermined period and the time of the previous request is later than the latest request of at least one item within the set of items stored in the cache.

22. The system of claim 21 wherein the processor is at a node of a network and the requesting device comprises a device at a node of a network different from the node of the processor.

23. The system of claim 21 wherein the processor is at a node of a network and the requesting device comprises a plurality of devices at a plurality of nodes of a network different from the node of the processor.

24. The system of claim 23 wherein the items of information comprise video information, the network comprises the Internet, and the requesting devices comprise user computers.

25. The system of claim 21 wherein the processor and the requesting device are identical such that processor processes the items it retrieves from the cache and other memory.

26. A system comprising:
a processor configured to retrieve and store items in memory in accordance with instructions;
a first memory having a first storage capacity;
a second memory having a second storage capacity greater than the first storage capacity;
a third memory having a third storage capacity greater than the second storage capacity;
the instructions comprising, in response to a request for a request for the item received by the processor:
retrieving the requested item from first memory when the requested item is stored in the first memory;
retrieving the requested item from second memory when the requested item is stored in the second memory;
retrieving the requested item from third memory when the requested item is stored in the third memory;
determining a priority value for the requested item and a plurality of items stored in the first memory, the priority value being based on a priority function, the priority function being based on the duration of time between requests for items with less weight being applied to durations between earlier requests for the item;

storing the requested item in the first memory when the item has been previously requested, the requested item is stored in the second memory, and the priority value of the requested item is greater than the priority value of at least one other item stored in the first memory.

27. The system of claim 26 wherein the first memory has a first access time, where access time refers to the average time it takes for the processor to obtain information from a memory; the second memory has a second access time slower than the first access time and; the third memory has a third access time slower than the second access time.

* * * * *